July 10, 1956 G. N. SMITH 2,753,776
SAFETY MECHANISM ON FILM FEEDING MEANS FOR CAMERA
Filed Oct. 13, 1952 5 Sheets-Sheet 1

INVENTOR.
GORDON N. SMITH
BY Buckhorn and Cheatham
Attorneys

July 10, 1956
G. N. SMITH
2,753,776
SAFETY MECHANISM ON FILM FEEDING MEANS FOR CAMERA
Filed Oct. 13, 1952
5 Sheets-Sheet 2
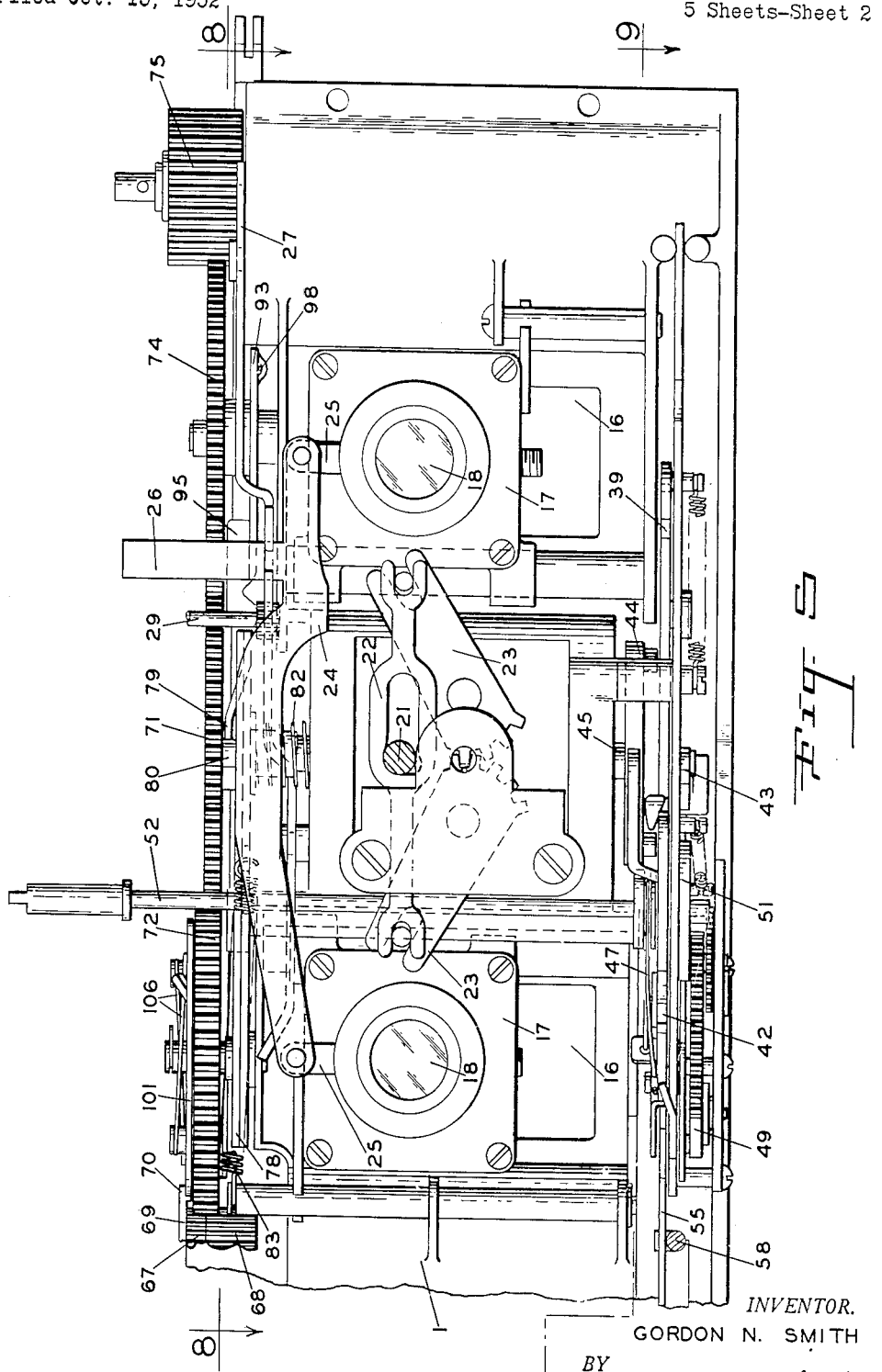
Fig. 5
INVENTOR.
GORDON N. SMITH
BY
Attorneys July 10, 1956
G. N. SMITH
2,753,776
SAFETY MECHANISM ON FILM FEEDING MEANS FOR CAMERA
Filed Oct. 13, 1952
5 Sheets-Sheet 3
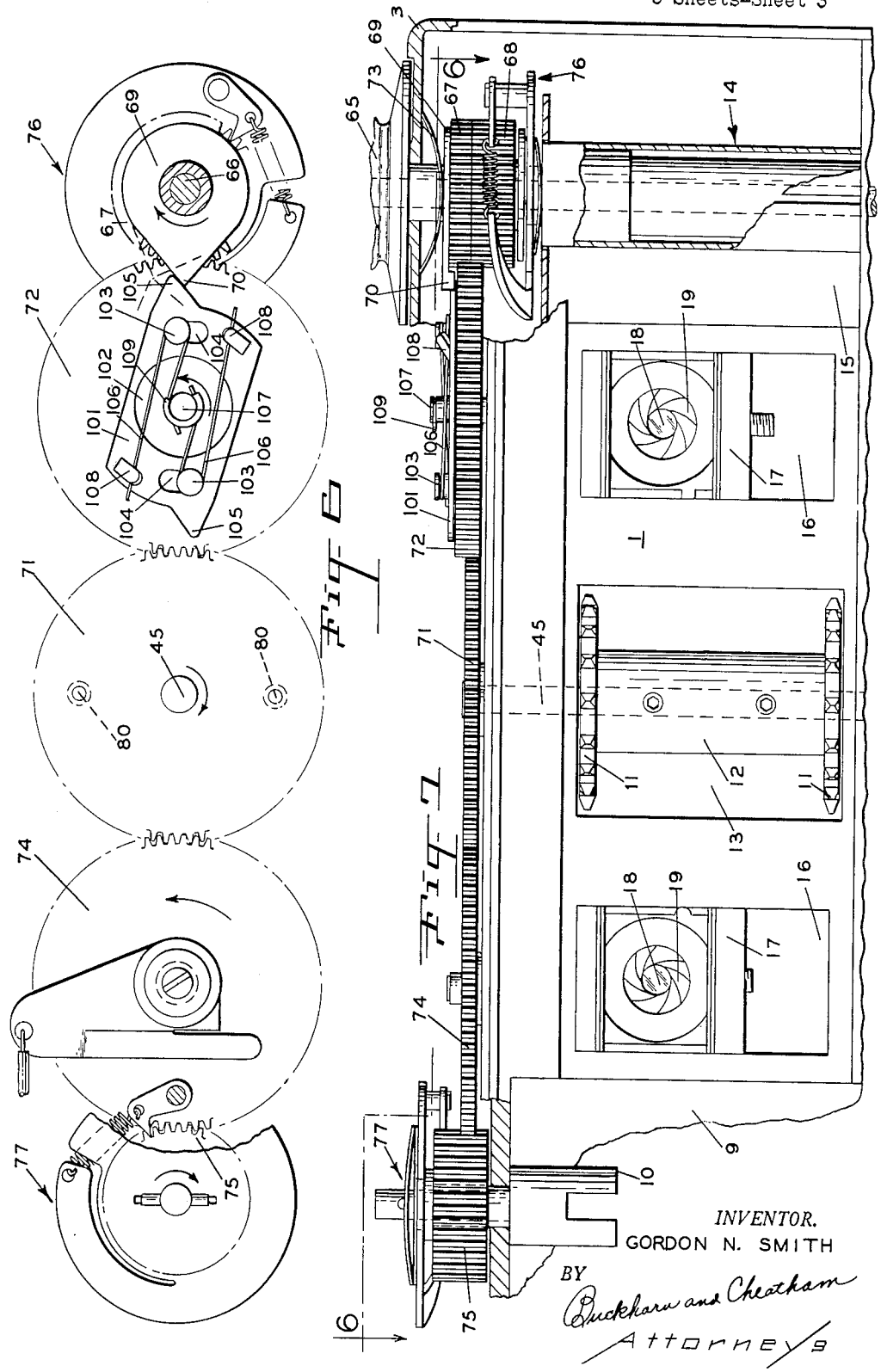
INVENTOR.
GORDON N. SMITH
BY Duckham and Cheatham
Attorneys

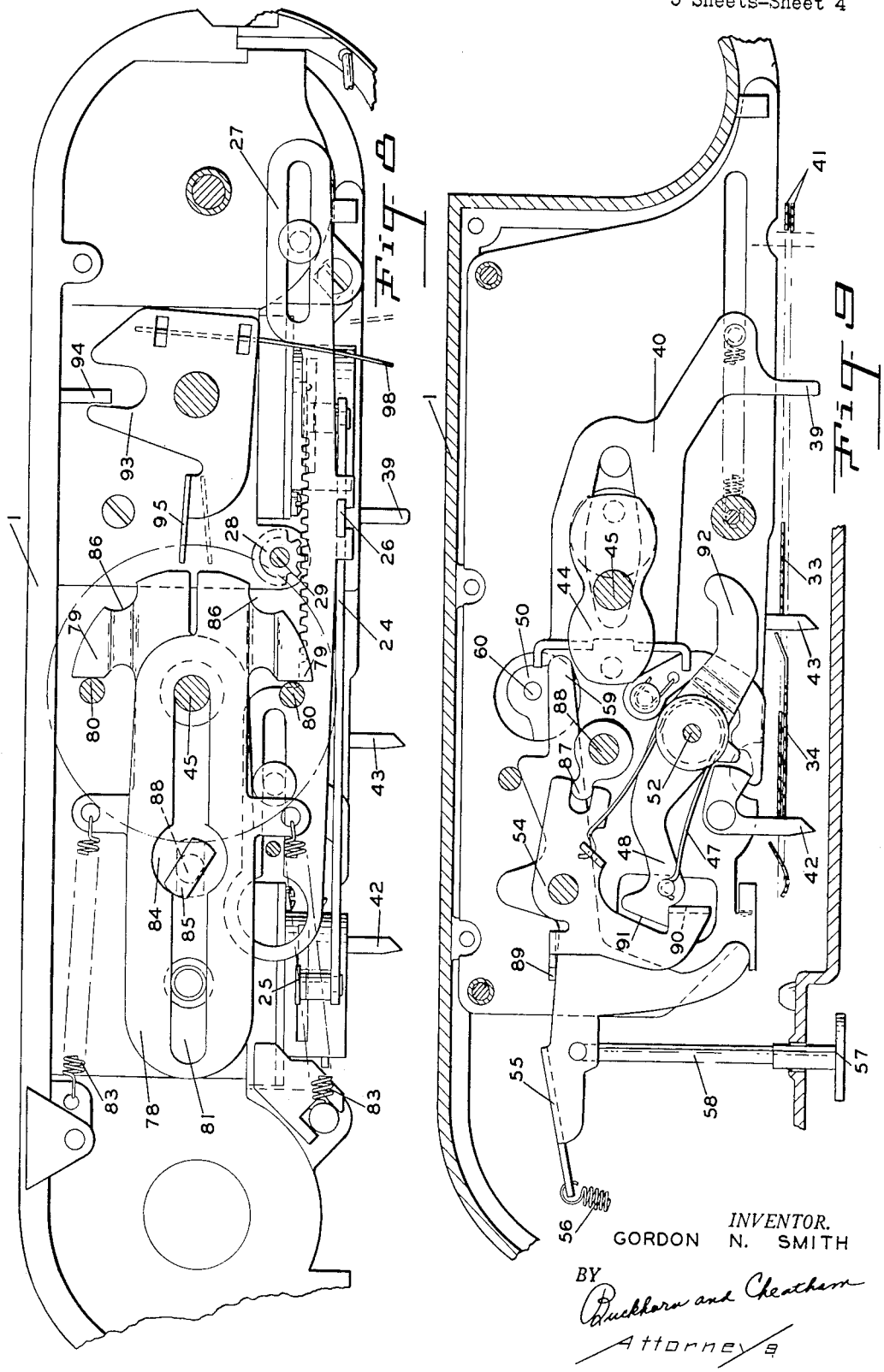

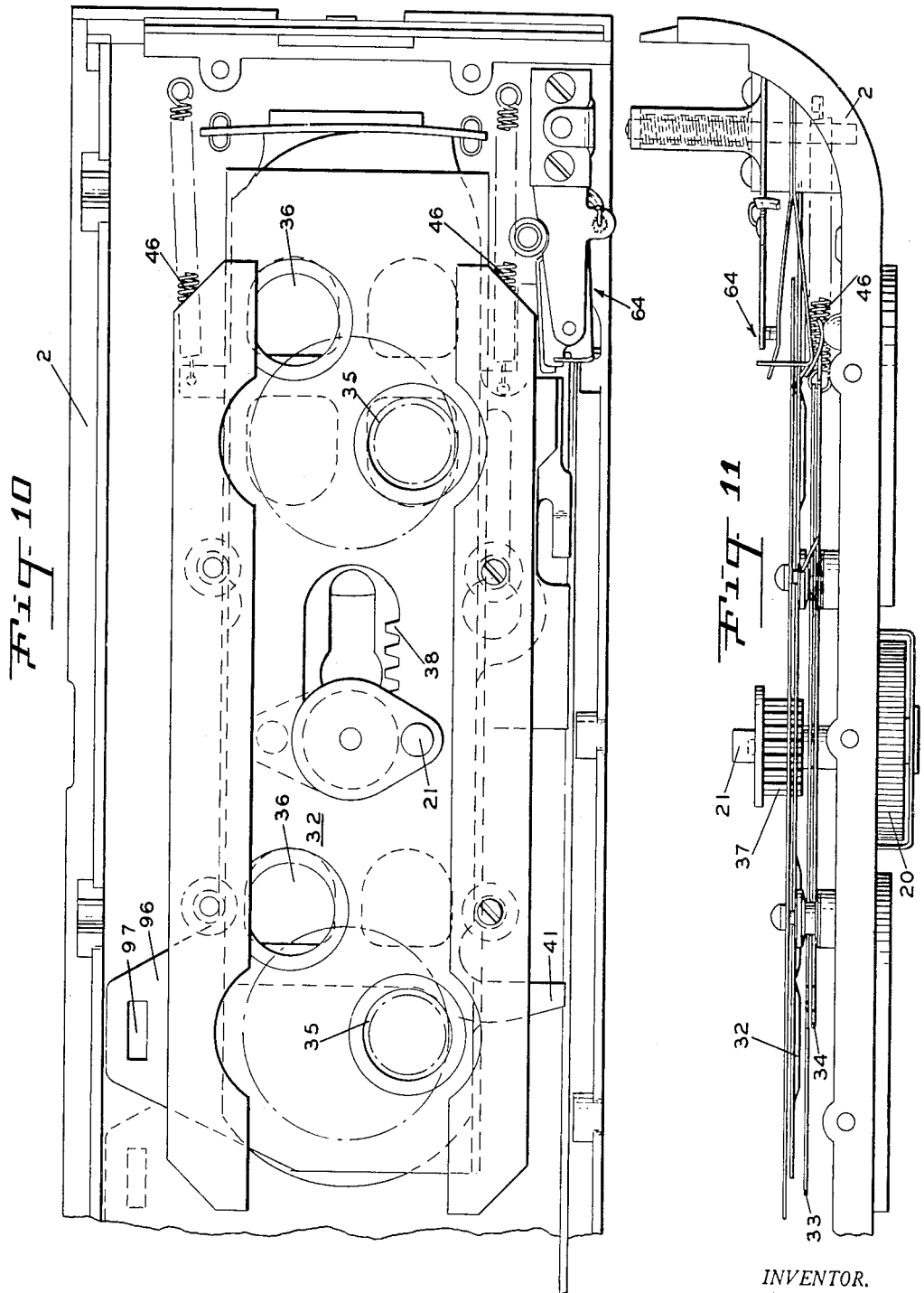

United States Patent Office 2,753,776
Patented July 10, 1956

2,753,776

SAFETY MECHANISM ON FILM FEEDING MEANS FOR CAMERA

Gordon N. Smith, Portland, Oreg., assignor to Sawyer's Inc., Portland, Oreg., a corporation of Oregon Application October 13, 1952, Serial No. 314,498

11 Claims. (Cl. 95—31)

My present invention comprises an improvement in the feeding mechanism of cameras utilizing strip film, the invention being of particularly utility in combination with a camera capable of taking a first series of pictures longitudinally of one half of the film while the film is being fed from a film cartridge, and then taking a second series of pictures longitudinally of the other half of the film while the film is being fed back into the cartridge. Such a camera is particularly devised for the production of stereo-paired transparencies, but may be used for producing two-dimensional pictures if desired. The present invention is herein illustrated, for convenience, in combination with the camera more completely illustrated, described and claimed in my copending application Serial No. 171,863, filed July 3, 1950, now Patent No. 2,680,400, issued June 8, 1954. Reference is also made to my prior Patent No. 2,557,478, issued June 19, 1951, for a more complete understanding of certain mechanisms herein illustrated. While the camera may be designed to produce photographs of different sizes or types, the invention is of particular utility in a camera designed to take pairs of 16 mm. frames spaced apart by the average human interpupillary distance for mounting in pocketed reels as disclosed and claimed in the patent to Kurz No. 2,571,584, issued October 16, 1951, such reels being adapted for use in stereoscopic viewers such as claimed in the patent to Gruber No. 2,511,334, issued June 13, 1950, or projected onto a screen by means such as illustrated in the patent to Gruber No. 2,525,598, issued October 10, 1950.

The principal object of the present invention is to render the camera safe against mishandling, the present invention comprising means positively to arrest the feeding mechanism at the end of a predetermined series of feeding movements in the direction to remove film from the cartridge, but to permit an unlimited number of feeding movements under any circumstance in the direction to return film to the cartridge. The invention is designed to eliminate a cause of expense and inconvenience occasioned by the belief of users that the camera was defective under certain operating conditions as will be explained later.

A further object of the present invention is to devise a safety device of the foregoing character which is relatively simple and easily manufactured and assembled in a camera of the type in question.

The objects and advantages of the present invention will be more readily apparent from inspection of the accompanying drawings taken in connection with the following specification wherein like numerals refer to like parts throughout.

In the drawings,

Fig. 5 is a front elevation, on an enlarged scale, of certain mechanisms contained in the camera, including the present invention;

Fig. 6 is a plan view of Fig. 5 with certain portions eliminated, the view being taken substantially along line 6—6 of Fig. 7;

Fig. 7 is a rear view of the interior of the camera, with certain portions being eliminated, and the present invention illustrated;

Fig. 8 is a horizontal section taken substantially along line 8—8 of Fig. 5, with certain parts being removed;

Fig. 9 is a horizontal section taken substantially along line 9—9 of Fig. 5;

Fig. 10 is a view of the shutter mechanism of the camera taken from inside the front cover of the camera looking outward; and Fig. 11 is a bottom view of Fig. 10.

Figure 1:
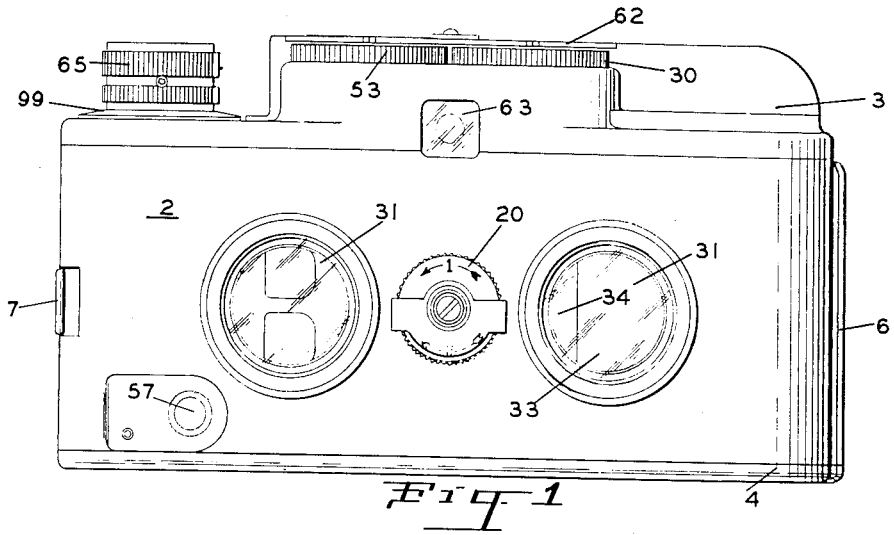
Fig. 1 is a front elevation of a camera embodying the present invention.

The camera herein illustrated is fully illustrated and described in detail in the above-identified copending application, hence only so much thereof as is necessary for an understanding of the present invention is herein illustrated and described. The camera comprises a cast metal frame 1 upon which is suitably retained a front casing member 2, a top casing member 3, and a bottom casing member 4. A rear casing member 5 is mounted upon a vertical pivot 6 and retained in closed position by a suitable catch indicated at 7, to form with the fixed casing members a light-sealed enclosure within which the mechanism is mounted. The rear casing member 5 includes a cartridge chamber closing portion 8 which closes the lower end of a cartridge chamber 9 in the frame whereby, when the rear cover is swung open, a film cartridge may be slid lengthwise into the chamber 9 and engaged with a winding fork 10 extending into the chamber. A pair of sprockets 11 mounted upon a hub 12 are retained in a sprocket chamber 13 centrally of the frame, portions of the sprockets projecting rearwardly to engage sprocket holes in the film strip led from the cartridge in chamber 9. The leader end of the film strip may be engaged with a take-up spool, generally indicated at 14, mounted in a take-up spool recess 15 at the end of the frame remote from the cartridge chamber 9. The film strip may be forced onto the take-up spool by the sprockets or forced back into the cartridge depending upon the direction of rotation of the sprockets. The rear casing member is provided with means (not shown) cooperating with surfaces of the frame to prevent the portion of the film between the chambers 9 and 15 from buckling whereby the sprockets may feed the film in either direction.

The frame 1 is provided with a pair of laterally spaced, vertically elongated passages 16 extending from front to rear of the frame and in each of which is mounted light tunnel forming means 17 through which light passes from the lenses to the film strip stretched along the back of the frame. Each of the means 17 supports a fixed focus lens 18 and an adjustable iris 19. The means 17 with their supported lenses and irises are simultaneously shiftable from an upper position at which exposures are made longitudinally of the upper half of the film strip to a lower position at which exposures are made longitudinally of the lower half of the film strip, one set of exposures being made while the film strip is fed stepwise longitudinally in one direction and the other set of exposures being made while the film strip is fed stepwise longitudinally in the opposite direction. Shifting of the means 17 is accomplished by manually rotating a shift knob 20 projecting forwardly from the front casing member 2 and connected to a crank 21 inside of the front casing member 2. The crank 21 engages a horizontal slot in a shifting yoke 22, the opposite ends of which are slotted to embrace projections on the means 17. Pivoted sector gear members 23 mesh with each other and are engaged with the means 17 to assure their simultaneous and coextensive movement. An iris adjusting bar 24 extends horizontally across the upper portion of the frame and is connected to the irises whereby simultaneous, coextensive adjustment of the irises may be achieved. The connection of the bar 24 to the irises is achieved through levers 25 pivotally connected to the ends of the bar and operatively associated with the irises in the usual fashion. The bar 24 is provided with a vertical portion 26 which is slidably embraced by suitable lugs on a horizontal bar 27 mounted on top of the frame and suitably guided for longitudinal movement. The bar 27 is provided with rack teeth which engage an iris adjusting pinion 28 fixed to the lower end of a shaft 29 which is suitably connected to an iris adjusting dial 30 mounted on the top casing member 3 and manually engageable to effect adjustment of the irises. When the means 17 are shifted in the vertical direction the portion 26 maintains engagement with the bar 27, thus permitting adjustment of the irises in either position of the lenses.

The front casing portion 2 is provided with a pair of large windows 31 of sufficient dimension to permit passage of light through the lenses 18 in either position of use. The inside of the front casing portion 2 is provided with suitable guiding means for retaining and guiding for lateral movement a plurality of plates, namely a selector plate 32, an inner shutter plate 33 and an outer shutter plate 34. The selector plate 32 is provided with a pair of laterally spaced lower openings 35 adapted to register with the lenses when in their lowered position, and a pair of laterally offset, laterally spaced upper openings 36 adapted to register with the lenses when the lenses are in their upper position. The selector plate is shifted laterally simultaneously with the vertical shifting of the lenses by means of a pinion 37 mounted on the shaft of knob 20 and engaging rack teeth 38 in one edge of a slot through the plate. When the lower set of openings 35 is in position to transmit light through the lenses, the upper openings 36 are behind opaque portions of the front casing member 2. Each of the shutter plates 33 and 34 is provided with apertures adapted to be moved past the lenses in the usual fashion of such devices to expose the film. The shutter plates are moved to a cocked position by a cocking finger 39 on a cocking lever 40, which finger engages projections 41 on the shutter plates. Both of the shutter plates are then engaged by a primary shutter latch 42 and the inner shutter plate 33 is additionally engaged by a secondary shutter latch 43. The cocking lever is moved to cock the shutter blades during the feeding of the film by means including a dumbbell-shaped member 44 on the lower end of the shaft 45 to which the sprockets 11 are fixed. The shutter blades are drawn to released position toward the right, as seen in Fig. 10, by individual shutter blade springs 46.

The shutter blades may be released so as to expose the film for variable, automatically controlled, short lengths of time or for variable, manually controlled, long lengths of time. For this purpose the latches are individually controlled by mechanism more completely disclosed in the above-identified copending application Serial No. 171,863. Such mechanism involves an actuating spring 47 which drives a pawl 48 and associated means to release the latch 42. The pawl 48 is connected with an escapement gear 49 which is suitably associated with a floating pawl 50 capable of releasing the secondary latch 43. The duration of time between release of the primary latch and the secondary latch is usually controlled by a timer cam 51 affecting movement of the floating pawl 50 as described in said application, the cam being fixed to the lower end of a timer cam shaft 52 which extends upwardly and is suitably engaged with a timer adjustment dial 53 on the top of the camera. The pawl 48 is held in latched position by a release pawl 54 having a portion engaged with a release lever 55 which is normally retained in the position shown in Fig. 9 by a release lever spring 56 and which may be moved to releasing position by a manual trip button 57 which is mounted exteriorly of the camera on the end of a push rod 58. As explained in the aforesaid application, the timer cam may be so set as to effect the release of the primary latch 42 upon depression of the button 57 without effecting release of the secondary latch 43 as long as the trip button 57 is held inwardly. In such circumstances the secondary latch 43 is released, when the button 57 is released, by a portion 59 of the release lever engaging a pin 60 projecting upwardly from the floating pawl 50 upon the return of the release lever to its normal position by the spring 56. Variable short exposures are made by so positioning the timer cam as to effect a rocking movement of the floating pawl 50 at variable time intervals after release of the primary shutter latch 42.

The iris adjusting dial 30 and the timer cam adjusting dial 53 effect rotative positioning of an indicator dial 61 bearing light intensity legends which may be matched with subject color legends on a stationary plate 62 partially enclosing the dials. As fully explained in the above-identified Letters Patent No. 2,557,478, proper exposures may be obtained by so rotating the dials 30 and 53 as to match the proper light index marking on dials 61 with the proper subject index marking on the plate 62. Such actuation of the dials adjusts the irises and the timer cam so that a proper exposure will be made upon actuation of the shutter releasing mechanism through the trip button 57. The camera is provided with a view finder indicated by its front lens 63. Provision is made for the mounting of a flash gun attachment on the camera and a synchronizing switch indicated generally at 64 is provided to enable the taking of flashlight exposures.

The sprockets 11 are capable of effecting a film advancing movement in one-half of one revolution, and are so actuated through the medium of a gear train driven by a feeding knob 65 projecting from the camera. The knob 65 is fixed to the upwardly projecting, outer end of a shaft 66, to the lower end of which is fixed a knob gear 67. The knob gear coaxially overlies a take-up spool gear 68 having the same diameter and the same number of teeth as the knob gear 67 and which is loosely mounted on the shaft of the take-up spool 14. An abutment plate 69 is fixed to the gear 67, the outer end of which projects radially beyond the gear 67 and provides a sharply pointed abutment 70. The sprocket gear shaft 45 carries a sprocket gear 71 at its upper end, the sprocket gear having approximately, but not exactly, twice the number of teeth on the knob gear 67. For example, the sprocket gear 71 may be provided with eighty-two teeth if the knob gear 67 is provided with forty teeth, one tooth less than half the number of teeth on the sprocket gear. The gear train comprises a thick, intermediate gear 72 which meshes with the sprocket gear 71 and the take-up spool gear 68, and with the knob gear 67 when in normal position as illustrated in Fig. 7. Accordingly, during normal rotation of the feeding knob 65 the sprocket gear 71 will be rotated, but rotation of the knob 65 may be effected while the sprocket gear 71 remains stationary if the knob gear is moved axially from engagement with the intermediate gear. For this purpose the shaft of the knob gear is axially slidable in its journal in the casing, and a spring 73 normally maintains the gear in lowered, engaging position. The sprocket gear 71 meshes with a gear 74 which drives a gear 75 loosely mounted on the shaft of the winding fork 10. Dog and friction driving devices indicated generally at 76 and 77 connect the gears 68 and 75, respectively, to the take-up spool 14 and fork 10, these devices, as fully explained in the above-identified application Serial No. 171,863, providing for proper rotation of the fork 10 and take-up spool 14 to wind the film into the respective ends of the frame when pushed toward the ends by the sprockets 11, slippage being provided to compensate for the increasing or decreasing diameter of the roll of film.

Means are provided to arrest the gear train at the same position at the end of each feeding movement including a pair of superimposed latching slides guided for longitudinal movement beneath the gears 71 and 74. The slides are provided with wings 79 which engage lugs 80 projecting downwardly from the gear 71, the lugs being opposed along a diameter of the gear. The slides 78 are provided with elongated slots 81 which engage the shaft 45 and the shaft of gear 74 to guide the slides in their longitudinal movement, and a spring 82 normally holds the slides upwardly in engagement with each other beneath the surface of the gear 71 so that the lugs 80 may engage the wings 79. Slide return springs 83 are tensioned between the frame and the respective slides 78 normally to maintain the slides in the position shown in Fig. 8. The slots 81 are intermediately enlarged, as indicated at 84, and a locking key 85 may be positioned diagonally across the slots in the enlargements 84, as seen in Fig. 8, to lock the slides against movement. In such case the lugs 80 engaging the wings 79 positively lock the gear train against movement. When the key is positioned in longitudinal alignment with the slots 81, the gear 71 may be rotated in either direction, the appropriate one of the lugs 80 longitudinally moving the appropriate slide 78 until the lug clears the wing and the spring 83 returns the wing to its proper position. The forward edge of each wing is provided with a notch and depression indicated at 86 so that the lug 80 may complete a half-revolution of movement by riding over the top of the opposed wing and depressing it against the force of the spring 82. The key 85 will be rotated to its locking position by a forked portion of the release pawl lever 54 engaging a crank 87 on the lower end of a shaft 88 which carries the key at its upper end. The release pawl 54 is provided with a tab 89 engaging behind an edge of the release lever 55 so that when the button 57 is depressed the crank 87 and key 85 are moved to align the key 85 with the slots 81. When the release pawl 55 is moved to this position, a tab 90 thereon engages an end surface 91 on the pawl 48 to hold the release pawl 54 in position and maintain the key in alignment with the slots even though the button 57 should return to its normal position. Thereupon actuation of the gear train is permitted for one-half of one revolution, during which the sprocket shaft 45 drives the dumbbell 44 into engagement with a projecting arm 92 on the pawl 48 to rock the pawl 48 to the position illustrated in Fig. 9 whereupon the spring 47 forces the pawl 54 into the position illustrated in Fig. 9, in which position the tab 90 engages the forward edge of the pawl 48 to lock the key in locking position, as illustrated in Fig. 8. Thus means are provided, associated with the feeding means, for arresting the gear train at the end of each half-revolution of movement, and means are provided, associated with shutter releasing means, for releasing the gear train when each exposure is made.

A locking plate 93 is pivotally mounted on the shaft of gear 72, the plate being provided with an edge slot into which projects an abutment 94 on the frame 1 to limit pivotal movement of the plate so as to position a vertical tab 95 in either of two positions, as illustrated in full and dash outline in Fig. 8. In either position the tab 95 engages the end of one of the slides 78 to prevent movement thereof when released by the key 85.

The selector plate 32 is provided with an upwardly projecting extension 96 in which there is an elongated, horizontal slot 97, and a spring wire locking plate shifting lever 98 mounted on the locking plate 93 projects forwardly into the slot 97 when the front cover 2 is assembled with the frame 1. As seen in Fig. 10, when the selector plate 32 is shifted into the position to permit exposures on the lower half of the film strip, the slot 97 is shifted longitudinally to one extreme, thus shifting the locking plate 93 to the position illustrated in Fig. 8 and holding the locking plate tab 95 in position to prevent longitudinal movement of the lower slide 78. When the crank 21 is shifted to the opposite extreme, the selector plate 32 is moved longitudinally to the position illustrated in dash line in Fig. 10, thus shifting the locking plate tab 95 to the position illustrated in dash line in Fig. 8. This permits the previously locked slide to move and causes the other slide to be held against movement. By reason of this construction the sprocket 11 is prevented from rotating in one direction while the lenses are lowered, and is prevented from rotating in the other direction while the lenses are raised.

The film feeding knob 65 is provided with a lower, horizontally projecting flange 99 on which appear indicia representing the number of exposures. The indicia are moved past a fixed pointer 100 on the upper surface of the top casing portion 3. In loading the camera, the film leader portion between the chambers 9 and 15 is exposed, hence this portion of the film must be taken up on the take-up spool before commencing to use the camera. This is done by closing the camera, and alternately operating the winding knob to cock the shutters and the trip button to release the shutters. Three such operations will result in the exposed film leader being taken up on the take-up spool 14 and operation of the winding knob will then cock the camera in readiness for a picture taking operation. During this time the shift knob 20 has been positioned in the manner illustrated in Fig. 1 with the numeral 1 exposed so that the feeding mechanism will be free to move in the direction to take film from the cartridge. The operator now grasps the film feeding knob 65 and pulls the knob axially outward, thus freeing the feeding knob gear 67 from the intermediate gear 72. The knob may now be rotated to position the desired numeral on the flange 99 opposite the pointer 100. For example, if a certain length of film strip is employed, the numeral 19 is placed opposite the pointer 100, and if a certain longer strip is employed, the numeral 35 is placed opposite the pointer 100. The abutment 70 on the abutment plate 69 is angularly aligned with the numeral 1 on the flange 99, and hence the abutment is angularly removed from alignment with the centerline between the gears 67 and 72 by the angular distance between the numeral 1 and the numeral positioned opposite the pointer 100 which is also on the centerline between the gears 67 and 72. By reason of the fact that the knob gear 67 has slightly less than one-half of the number of teeth as the intermediate gear 72, each half-revolution of the sprockets 11 corresponding to each exposure or stepwise feeding movement of the film will cause the numeral 1 to approach the pointer 100. In the example given, the increment of approach at each operation is approximately the width of one tooth. The exact increment can be mathematically computed and the index markings on the flange 99 positioned accordingly so that the numeral 1 comes to rest opposite the pointer 100 when the proper number of exposures has been taken while still leaving a portion of the film strip engaged within the film cartridge. In the above-identified application Serial No. 171,863, it is disclosed that means are provided to arrest feeding operations in this direction at this point so that subsequent feeding movements in the direction to withdraw film from the cartridge are prevented. The operator now knows that he should shift the shift knob 20 to its opposite extreme, thus freeing the gear train to revolve in the opposite direction, shifting the selector plate to permit exposures in the other longitudinal half of the film strip, and shifting the means 17 accordingly. Thereafter, each feeding movement will be accomplished in a direction to force film back into the cartridge and thus causing the numeral 19, or 35, or other selected numeral at which the feeding steps were commenced originally, to approach the pointer 100. When this numeral reaches the pointer 100 the operator knows that the exposed leader strip portion is again behind the lenses whereupon he may rapidly operate the camera three or four times to return the entire film strip into the cartridge to the extent that the film strip is engaged by the sprockets 11.

Figure 2:
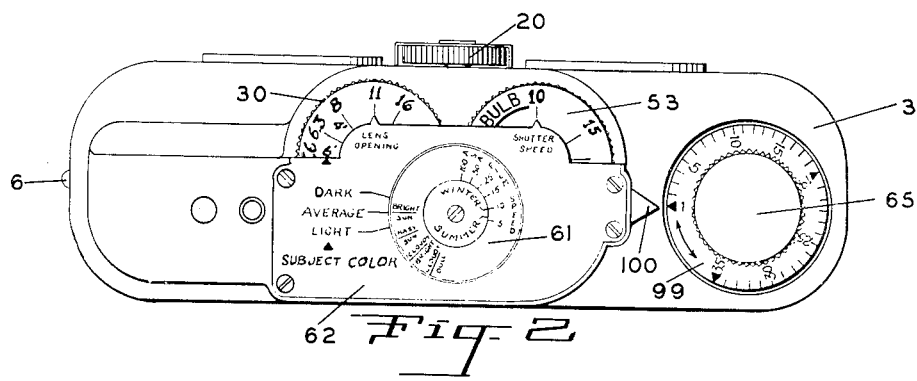
Fig. 2 is a plan view of the camera.
Figure 3:
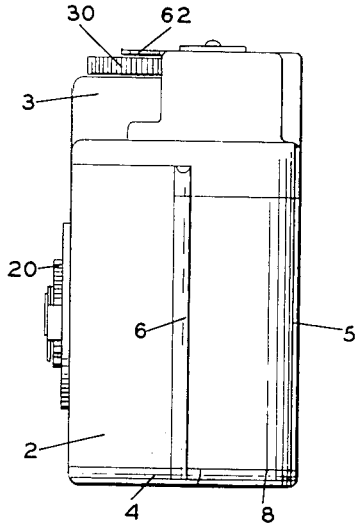
Fig. 3 is an end view of the camera.
Figure 4:
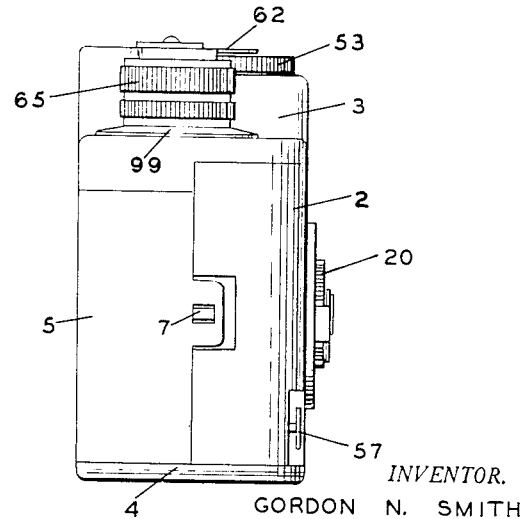
Fig. 4 is an opposite end view of the camera.

The means provided in the above-identified application comprised a pair of upwardly projecting pins diametrically disposed on the intermediate gear 72 so as to describe a circle intersecting the circle described by the tip of an abutment plate affixed to the knob gear and similar to the abutment plate 69. As long as instructions were properly followed, no difficulty was encountered with this construction. However, it sometimes occurred that persons operating the camera would so maneuver the film feeding knob 65 that the abutment became lodged against one of the pins on gear 72 when the gear train was functioning to move in the direction to force film into the cartridge. For example, if a film strip were employed of such length that the exposure counter was initially set with the numeral 35 opposite the pointer 100 in accordance with instructions, there is a relatively large space between the numeral 35 and the numeral 1 on the flange 99, in which there is provided a double-headed arrow, as illustrated in Fig. 2, to permit operation of the camera at least six or seven times before the abutment would engage in this direction of movement. Instructions for the camera directed that three or four such operations are sufficient, and that the camera should thereupon be opened and the reloaded cartridge removed. Occasionally an operator would continue operations beyond the three or four required, and thus bring the abutment into engagement with one of the pins, locking the camera against further movement. The camera could be freed by pulling the knob 65 axially to lift the abutment over the pin on gear 72, or the situation could be ignored while the cartridge is removed. However, inexperienced operators and even dealers have been misled into thinking that the camera was defective and had jammed, thus leading to a claim for reparations. The present invention is designed to prevent this situation from arising and comprises the following mechanism.

A plate 101, provided with a large central opening 102, is held on the smooth upper surface of the gear 72 by a pair of shoulder pins 103 whose heads engage the plate beyond the sides of slots 104 through which the stems of the pins project from the gear 72. The pins 103 are diametrically opposed on the gear 72 in substantially longitudinal alignment with the centerlines of the gears when the lugs 80 are in arrested engagement with the wings 79 on the slides 78, and the slots 104 extend in a circumferential direction in diametrically opposed relation. A pair of projections 105 are provided on the plate 101, the tips of the projections describing a circle intersecting the circle described by the abutment 70, and the projections being approximately as wide as one of the teeth of gear 72, and being provided with divergent sides. A pair of hairpin springs 106 respectively embrace reduced portions of the pins 103, each of the springs having a leg thrusting against the upwardly extended end of shaft 107 of gear 72 and its other leg thrusting outwardly against a tongue 108 struck upwardly from the plate 101 adjacent the opposite slot. A snap ring 109 is engaged in a groove at the upper end of shaft 107 to prevent misplacement of the hairpin springs. The hairpin springs normally maintain the plate in such relation to the gear that the pins 103 engage the same respective ends of the slots 104. Thus when the numeral 1 on the flange 99 of the feeding knob is aligned with the pointer 100 at the end of the first series of stepwise movements of the film strip from the cartridge, the abutment 70 engages one or the other of the projections 105 rigidly to lock the gear train against further movement in that direction, thus advising the operator to manipulate the shift knob to free the mechanism for reverse movement. However, if the abutment 70 should engage one or the other of the projections 105 in the reverse direction of movement, as indicated by the arrows in Fig. 6, the abutment 70 would merely move the projection aside to the position indicated in dash outline in Fig. 6 and the operations in this direction could continue. It will be obvious from inspection of Fig. 6 that engagement can only occur at one point since the slanting sides of the abutment 70 and the projections 105 will clear each other at any other point.

Two projections 105 are provided since each feeding step is accomplished in one-half of one revolution of the intermediate gear 72, and initial setting of the counter may be accomplished when either of the projections 105 is toward the abutment 70, with the result that either projection 105 may be rendered effective to arrest the gear train at the end of the first series of feeding movements. Also, the operator may set the counter mechanism so as to cause the gear train to be arrested at the end of any number of exposures. If this should be an even number, one of the projections 105 will be effective, and the other will be effective if this should be an odd number.

From the foregoing it will be apparent to those skilled in the art that the present invention recognizes a problem which may be encountered in any number of different types of cameras and provides a universal solution therefor. The present invention may be incorporated, for example, in a camera for making exposures across the entire width of a film strip when fed in one direction, the arresting abutment and plate on the meshing gears being provided to prevent withdrawal of the entire film strip of the cartridge or spool so that it may be returned to the cartridge or spool at the end of the proper number of feeding steps in the withdrawing direction. It will be recognized that the present invention may comprise means for completing a feeding step in one or more revolutions of a sprocket rather than one-half of a revolution, and that other feeding means may be operated and controlled in accordance with the present invention. Likewise, it will be apparent to those skilled in the art that the ratio of the number of teeth on the meshing gears upon which the plate and abutment are mounted need not be approximately two to one, but that the ratio may be any other multiple, such as one to one, three to one, four to one, or the like, depending upon gear arrangements and other factors. Accordingly, the plate which engages the abutment may be provided with one abutment engaging projections, two, three, or more, as the situation may demand. The invention is therefore expressed in two general types of claims, one set of claims being drawn to the combination of the present invention in a camera functioning as described in the above noted copending application, Serial No. 171,863, and another set of claims being directed to the present invention as it may be incorporated in any of a number of other types of cameras.

Having illustrated and described a preferred embodiment of the present invention, it should be apparent to those skilled in the art that the same permits of modification in arrangement and detail. I claim as my invention all such modifications as come within the true spirit and scope of the following claims.

I claim:

1. In a camera of the type comprising a sprocket adapted to engage sprocket holes in a strip film, means to retain a strip film cartridge at one side of said sprocket, a take-up spool at the other side of said sprocket, a winding knob, means including an intermediate gear in driving association with said sprocket, a take-up spool gear in driving association with said take-up spool, said take-up spool gear meshing with said intermediate gear, a winding knob gear having approximately but not exactly one half the number of teeth on said intermediate gear, said knob gear being fixed to said winding knob and normally meshing with said intermediate gear, means mounting said winding knob and said knob gear for limited axial movement to separate said knob gear from said intermediate gear, means locking said intermediate gear against movement at the end of each film feeding movement, shutter means, shutter cocking means operatively associated with said sprocket for cocking said shutter means during each feeding movement, shutter latching means to hold said shutter means in cocked position, releasing means operatively connected to said shutter latching means and operable to release said shutter latching means, and means operatively associated with said releasing means to release said intermediate gear upon actuation of said releasing means; the improvement of an abutment fixed to said knob gear and shiftable axially therewith whereby said abutment may be rotated to any selected position when said knob gear is shifted out of engagement with said intermediate gear, a plate pivotally mounted coaxially with said intermediate gear, said plate having a projection whose tip describes a circle intersecting the circle described by said abutment when in normal position, said plate being positioned so that said projection projects into the path of said abutment between each film feeding movement of said intermediate gear, whereby said abutment will engage said projection after a definite number of film feeding movements determined by the initial rotative position of said abutment, said plate having a circumferentially directed slot therein adjacent said projection and said intermediate gear having a pin projecting into said slot, and resilient means normally maintaining said pin against an end of said slot whereby said projection positively engages said abutment at the end of a predetermined number of feeding movements in the direction to withdraw film from the cartridge and thus prevents subsequent feeding movements in that direction, said resilient means permitting relative rotation of said plate with respect to said intermediate gear to the extent of said slot whereby said projection is moved out of the way of said abutment by said abutment if they should become engaged during feeding movements in the opposite direction.

2. In a camera of the type comprising a sprocket adapted to engage sprocket holes in a strip film, means to retain a strip film cartridge at one side of said sprocket, a take-up spool at the other side of said sprocket, a winding knob, a sprocket gear in driving association with said sprocket, an intermediate gear meshing with said sprocket gear, a take-up spool gear drivingly associated with said take-up spool, said take-up spool gear meshing with said intermediate gear, a knob gear having a slightly different number of teeth than half the number of teeth on said intermediate gear, said knob gear being fixed to said winding knob and normally meshing with said intermediate gear, means mounting said winding knob and said knob gear for limited axial movement to separate said knob gear from said intermediate gear, said sprocket accomplishing a complete film feeding movement in one-half of a revolution of said intermediate gear, means locking said intermediate gear against movement at the end of each half-revolution thereof, shutter means, shutter cocking means operatively associated with said sprocket for cocking said shutter means during each feeding movement, shutter latching means to hold said shutter means in cocked position, releasing means operatively connected to said shutter latching means and operable to release said shutter latching means, and means operatively associated with said releasing means to release said intermediate gear upon actuation of said releasing means; the improvement of an abutment fixed to said knob gear and shiftable axially therewith whereby said abutment may be rotationally positioned to selective positions when said intermediate gear is arrested, a plate pivotally mounted coaxially with said intermediate gear, said plate having a pair of oppositely extending projections whose tips describe a circle intersecting the circle described by said abutment when in normal position, and means interconnecting said plate to said intermediate gear for causing said plate to rotate with said intermediate gear and to position the plate with one of the projections thereof projecting into the path of said abutment between each film feeding movement, said interconnecting means including a pin and slot connection and resilient means normally maintaining said plate in such position relative to said intermediate gear that either of said projections positively engages said abutment at the end of a predetermined number of feeding movements in the direction to withdraw film from the cartridge and thus prevents subsequent feeding movements in that direction, but permitting relative rotation of said plate with respect to said intermediate gear whereby said projections are moved out of the way of said abutment by said abutment upon engagement thereof during feeding movements in the opposite direction.

3. In a camera of the type comprising a sprocket adapted to engage sprocket holes in a strip film, a winding knob, a sprocket gear fixed to and coaxial with said sprocket, an intermediate gear meshing with said sprocket gear, a knob gear having a slightly different number of teeth than one-half the number of teeth on said intermediate gear, said knob gear being fixed to said winding knob and normally meshing with said intermediate gear, means mounting said winding knob and said knob gear for limited axial movement to separate said knob gear from said intermediate gear, said sprocket accomplishing a complete film feeding movement in one-half of a revolution of said intermediate gear in either direction, means locking said sprocket against movement at the end of each feeding movement, shutter means, shutter cocking means operatively associated with said sprocket for cocking said shutter means during each feeding movement, shutter latching means to hold said shutter means in cocked position, releasing means operatively connected to said latching means and operable to release said latching means, and means operatively associated with said releasing means to free said sprocket; the improvement of an abutment fixed to said knob gear and shiftable axially therewith whereby said abutment may be rotated to any selected position when said knob gear is shifted out of engagement with said intermediate gear, a plate pivotally mounted coaxially with said intermediate gear, said plate having a pair of oppositely extending projections whose tips describe a circle intersecting the circle described by said abutment when in normal position, means fixing said plate to said intermediate gear for rotation therewith in one direction whereby either of said projections positively engages said abutment at the end of a predetermined number of feeding movements in one direction and thus prevents subsequent feeding movements in that direction, and means permitting movement of said plate with respect to said intermediate gear when said intermediate gear is rotated in the opposite direction whereby said projections are moved out of the way of said abutment by said abutment if they should become engaged during feeding movements in the opposite direction.

4. In a camera of the type comprising a sprocket adapted to engage sprocket holes in a strip film, means to retain a strip film cartridge at one side of said sprocket, a take-up spool at the other side of said sprocket, a winding knob, a sprocket gear fixed to and coaxial with said sprocket, an intermediate gear meshing with said sprocket gear, a take-up spool gear, means drivingly connecting said take-up spool gear with said take-up spool, means drivingly connecting said take-up spool gear with said intermediate gear, a knob gear fixed to said winding knob, said knob gear having about the same number of teeth as one-half the number of teeth on said intermediate gear and normally meshing with said intermediate gear, means mounting said winding knob and said knob gear for limited axial movement to separate said knob gear from said intermediate gear, knob gear spring means normally holding said knob gear in mesh with said intermediate gear, said sprocket accomplishing a complete film feeding movement in one-half of a revolution of said intermediate gear, means locking said intermediate gear against movement at the end of each half-revolution thereof, shutter means, shutter cocking means operatively associated with said sprocket gear for cocking said shutter means during each feeding movement, shutter latching means effective to hold said shutter means in cocked position, releasing means operatively connected to said latching means and operable to release said latching means, and means operatively associated with said releasing means to release said intermediate gear upon actuation of said releasing means; the improvement of an abutment fixed to said knob gear and shiftable axially therewith whereby said abutment may be rotationally positioned to selective positions, a plate pivotally mounted on said intermediate gear, said plate having a pair of oppositely extending projections whose tips describe a circle intersecting the circle described by said abutment when in normal position, said plate being positioned on said intermediate gear so that one of said projections extends into the circular path of said abutment between film feeding movements of said intermediate gear, said plate having a pair of oppositely disposed, circumferentially directed slots therein adjacent said projections and said intermediate gear having a pair of pins projecting into said slots, and a pair of hairpin springs respectively embracing said pins, each of said hairpin springs having one leg thrusting against said plate in a direction to cause said pins to abut the same respective ends of said slots whereby either of said projections positively engages said abutment at the end of a predetermined number of feeding movements in the direction to withdraw film from the cartridge and thus prevents subsequent feeding movements in that direction, said hairpin springs permitting relative rotation of said plate with respect to said intermediate gear to the extent of said slots whereby said projections are moved out of the way of said abutment by said abutment upon engagement thereof during feeding movements in the opposite direction.

5. In a camera of the type comprising feeding means to engage and move a strip film, a winding knob, a gear train operatively associated with said feeding means and including an intermediate gear, a winding knob gear having a slightly different number of teeth than one-half the number of teeth on said intermediate gear, said winding knob gear being fixed to said winding knob and normally meshing with said intermediate gear, means mounting said winding knob and said winding knob gear for limited axial movement to separate said winding knob gear from said intermediate gear, said feeding means accomplishing a complete film feeding movement in one-half of a revolution of said intermediate gear in either direction, means locking said intermediate gear against movement at the end of each half-revolution thereof, shutter means, shutter cocking means operatively associated with said feeding means for cocking said shutter means during each feeding movement, shutter latching means effective to retain said shutter means in cocked position, releasing means operatively connected to said latching means and operable to release said shutter latching means, and means operatively associated with said releasing means to release said intermediate gear upon actuation of said releasing means; the improvement of an abutment fixed to said winding knob gear and shiftable axially therewith whereby said abutment may be rotated to any selected position when said winding knob gear is shifted out of engagement with said intermediate gear, a plate pivotally mounted coaxially with said intermediate gear, said plate having a pair of oppositely extending projections whose tips describe a circle intersecting the circle described by said abutment when in normal position, said plate having a pair of oppositely disposed, circumferentially directed slots therein adjacent said projections and said intermediate gear having a pair of pins projecting into said slots, and resilient means normally maintaining said pins against the same respective ends of said slots, said pins being positioned so that either of said projections is positioned in the circular path of said abutment between film advancing movements of said intermediate gear whereby either of said projections positively engages said abutment at the end of a predetermined number of feeding movements in the direction to withdraw film from the cartridge and thus prevents subsequent feeding movements in that direction, said resilient means permitting relative rotation of said plate with respect to said intermediate gear to the extent of said slots whereby said projections are moved out of the way of said abutment by said abutment if they should become engaged during feeding movements in the opposite direction.

6. Film advancing mechanism for a camera comprising a winding knob, a first gear driven by said winding knob, a second gear meshing with said first gear and having a number of teeth different from a multiple of the number of teeth of said first gear, film advancing means in driven association with said second gear for advancing film in either direction upon rotation of said knob respectively in either direction, an abutment affixed to one of said gears, a plate slidably mounted on the other of said gears, means interconnecting said plate and said other gear including positive driving means for positively rotating said plate with said other gear in one direction and resilient lost-motion means normally maintaining said plate in the same relative position with respect to said gear but permitting slippage of said plate relative to said gear in the opposite direction of rotation, said plate having a portion engageable with said abutment at one relative position of said gears, said positive driving means preventing continued movement of said gears when engagement of said plate and said abutment occurs in response to rotation of said knob in one direction of rotation and said lost-motion means permitting continued rotation of said gears when said plate and said abutment engage during rotation of said knob in the opposite direction.

7. Film advancing mechanism for a camera comprising reversible film advancing means including a first gear and a second gear meshing with said first gear and having a number of teeth different from a multiple of the number of teeth of said first gear, an abutment affixed to said first gear, a plate slidably mounted on said second gear, means interconnecting said plate and said second gear including positive driving means for rotating said plate together with said second gear in one direction and resilient connecting means normally maintaining said plate in the same relative position with respect to said second gear but permitting said plate to move with respect to said second gear while said second gear rotates a limited amount in the opposite direction of rotation, said plate having a portion engageable with said abutment at one relative position of said gears, said positive driving means preventing continued movement of said gears when engagement of said plate and said abutment occurs during rotation of said second gear in said one direction of rotation and said resilient means permitting continued rotation of said gears when said plate and said abutment engage during rotation of said second gear in said opposite direction.

8. In a camera comprising means to make a series of exposures longitudinally of a strip film in one longitudinal portion of the film while feeding the film stepwise in one direction and to make a second series of exposures longitudinally of the film in another longitudinal portion of the film while feeding the film stepwise in the opposite direction, film feeding means including a reversible gear train, said gear train comprising a first gear having a predetermined number of teeth, a second gear meshing with said first gear and having a number of teeth different from a multiple of the number of teeth of said first gear, an abutment on said first gear, a slidably mounted plate on said second gear in position normally to engage said abutment at one relative position of said gears, a positive driving connection interconnecting said plate and said second gear for positively driving said plate by said second gear in one direction of rotation, a loose connecting means permitting slippage of said plate with respect to said second gear in the same direction, said loose connecting means including a spring normally holding said plate and said second gear in such relative position that said positive driving connection is operative in said one direction of rotation but yieldable to permit relative slippage of said plate with respect to said second gear whereby said second gear may move in the opposite direction of rotation a limited amount while said plate remains stationary, said abutment and plate locking said gears against continued movement when they engage each other as the gears are being rotated in said one direction of rotation and said plate being moved aside against the force of said resilient means when said plate and abutment engage during rotation of said gears in the opposite direction of rotation, said plate and abutment thereby functioning to arrest said film feeding means at the end of a predetermined series of feeding movements in one direction but permitting an unlimited number of feeding steps when feeding the film in the opposite direction.

9. In a camera comprising means to make a series of exposures longitudinally of a strip film in one longitudinal portion of the film while feeding the film stepwise in one direction and to make a second series of exposures longitudinally of the film in another longitudinal portion of the film while feeding the film stepwise in the opposite direction, film feeding means including a reversible first gear having a predetermined number of teeth, a second gear meshing with said first gear and having a number of teeth different from a multiple of the number of teeth of said first gear, an abutment on one of said gears, a slidably mounted plate on the other of said gears in position normally to engage said abutment at one relative position of said gears, a positive driving connection interconnecting said plate and said other gear for positively driving said plate by said other gear in one direction of rotation, a loose connecting means permitting slippage of said plate with respect to said other gear in the same direction of rotation including a spring normally holding said plate and said other gear in such relative position that said positive driving connection is operative in said one direction of rotation but yielding to permit relative slippage of said plate with respect to said other gear in the same direction of rotation whereby said other gear may move in the opposite direction of rotation a limited amount while said plate remains stationary, said abutment and plate locking said gears against continued movement when they engage each other as the gears are being rotated in said one direction of rotation and said plate being moved aside against the force of said spring when said plate and abutment engage during rotation of said gears in the opposite direction of rotation, said plate and abutment thereby functioning to arrest said film feeding means at the end of a predetermined series of feeding movements in one direction but permitting an unlimited number of feeding steps when feeding the film in the opposite direction, and means for separating said gears to permit relative rotation thereof while separated whereby said gears may be preset at a preselected relation to each other in order to vary the number of feeding steps of said film in the first direction of movement prior to locking engagement of said abutment with said plate.

10. In a camera, film feeding means for feeding film stepwise in either direction, said film feeding means comprising a first gear, a second gear meshing with said first gear and having a number of teeth slightly different from a multiple of the number of teeth of said first gear, an abutment on one of said gears, a member slidably mounted on an end face of the other of said gears and engageable with said abutment during rotation of said gears, a positive driving connection between said member and said other gear in one direction of rotation, and a resilient driving connection between said member and said other gear normally holding said member in such relative position to said other gear that said positive driving connection is effective in one direction of rotation but yieldable to permit said member to remain stationary while said other gear moves in the opposite direction of rotation, said abutment and member locking said gears against continued movement when they engage each other as the gears are being rotated in said one direction of rotation and said resilient driving connection yielding to permit said abutment to pass said member when they engage each other during rotation of said gears in the opposite direction of rotation, said abutment and member thereby functioning to arrest said film feeding means at the end of a predetermined series of feeding movements in one direction but permitting an unlimited number of feeding movements in the opposite direction.

11. In a camera, film feeding means for feeding film stepwise in either direction, said film feeding means comprising a first gear, a second gear meshing with said first gear and having a number of teeth slightly different from a multiple of the number of teeth of said first gear, an abutment on one of said gears, a member slidably mounted on an end face of the other of said gears and engageable with said abutment during rotation of said gears, a positive driving connection between said member and said other gear in one direction of rotation, a resilient driving connection between said member and said other gear normally holding said member in such relative position to said other gear that said positive driving connection is effective in one direction of rotation but yieldable to permit said member to remain stationary while said other gear moves in the opposite direction of rotation, said abutment and member locking said gears against continued movement when they engage each other as the gears are being rotated in said one direction of rotation and said resilient driving connection yielding to permit said abutment to pass said member when they engage each other during rotation of said gears in the opposite direction of rotation, said abutment and member thereby functioning to arrest said film feeding means at the end of a predetermined series of feeding movements in one direction but permitting an unlimited number of feeding movements in the opposite direction, and means to separate said gears to permit relative rotation thereof while separated whereby said gears may be preset in meshing engagement with each other in order to vary the number of feeding movements of said film in said one direction prior to locking engagement of said abutment with said member.

References Cited in the file of this patent

UNITED STATES PATENTS

| 2,090,017 | Young | Aug. 17, 1937 |
| 2,150,642 | Wachtler | Mar. 14, 1939 |
| 2,194,284 | Kuppenbender | Mar. 19, 1940 |
| 2,266,656 | Nuchterlein | Dec. 16, 1941 |
| 2,345,999 | Babcock | Apr. 4, 1944 |
| 2,385,804 | Fitz | Oct. 2, 1945 |
| 2,418,594 | Morse | Apr. 8, 1947 |
| 2,453,075 | Land et al. | Nov. 2, 1948 |
| 2,476,576 | Bachelder | July 19, 1949 |
| 2,515,272 | Smith | July 18, 1950 |
| 2,548,172 | Pollock | Apr. 10, 1951 |
| 2,601,817 | Samoggia | July 1, 1952 |

FOREIGN PATENTS

| 624,351 | Germany | Jan. 18, 1936 |
| 626,104 | Germany | Feb. 20, 1936 |
| 641,181 | Germany | Jan. 22, 1937 |
| 644,420 | Germany | May 3, 1937 |
| 367,365 | Italy | Jan. 23, 1939 |
| 500,626 | Great Britain | Feb. 13, 1939 |
| 686,736 | Germany | Jan. 19, 1940 |
| 688,661 | Germany | Feb. 27, 1940 |
| 867,402 | France | July 28, 1941 |
| 555,885 | Great Britain | Sept. 10, 1943 |